United States Patent
Hellenbrand

(10) Patent No.: US 9,669,951 B2
(45) Date of Patent: Jun. 6, 2017

(54) SYSTEMS AND METHODS FOR PACKAGING DEVICES

(71) Applicant: CareFusion Germany 326 GmbH, Kelberg (DE)

(72) Inventor: Christoph Hellenbrand, Kaifenheim (DE)

(73) Assignee: CareFusion Germany 326 GmbH, Kelberg (DE)

( * ) Notice: Subject to any disclaimer, the term of this patent is extended or adjusted under 35 U.S.C. 154(b) by 0 days.

(21) Appl. No.: 14/880,452

(22) Filed: Oct. 12, 2015

(65) Prior Publication Data

US 2017/0101199 A1    Apr. 13, 2017

(51) Int. Cl.
| | |
|---|---|
| *B65B 5/06* | (2006.01) |
| *B65B 41/00* | (2006.01) |
| *B65G 17/26* | (2006.01) |
| *B65G 43/06* | (2006.01) |
| *B65G 17/06* | (2006.01) |

(52) U.S. Cl.
CPC ............... *B65B 5/06* (2013.01); *B65B 41/00* (2013.01); *B65G 17/067* (2013.01); *B65G 17/26* (2013.01); *B65G 43/06* (2013.01); *B65G 2203/0275* (2013.01)

(58) Field of Classification Search
CPC ......... B65B 5/06; B65B 41/00; B65G 17/067; B65G 17/26; B65G 43/06
USPC ........ 198/341.08, 341.09, 464.1, 469.1, 547, 198/575, 577, 617
See application file for complete search history.

(56) References Cited

U.S. PATENT DOCUMENTS

| | | | | |
|---|---|---|---|---|
| 6,318,916 B1 * | 11/2001 | Hofmann | ............. | B41J 11/0085 101/484 |
| 6,472,218 B1 * | 10/2002 | Stylli | ....................... | B01J 19/00 198/346.1 |
| 7,795,556 B1 * | 9/2010 | Dean | ..................... | B07C 5/3422 198/698 |

(Continued)

FOREIGN PATENT DOCUMENTS

| | | |
|---|---|---|
| DE | 1 086 173 B | 7/1960 |
| DE | 83 11 998.1 U1 | 11/1983 |

(Continued)

OTHER PUBLICATIONS

European Search Report issued in corresponding EP Application No. 15189304.7 dated Feb. 8, 2016 (9 pages).

*Primary Examiner* — Douglas Hess
(74) *Attorney, Agent, or Firm* — McDermott Will & Emery LLP

(57) ABSTRACT

A method for operating a packaging device and a packaging device are provided. Guide units which are fastened to transporter of a transport unit are moved along a plurality of supply and dispensing units. The transporter is driven by a drive axle coupled to a motor and returned via a deflection axle, the motor being coupled to a control unit. The transporter and/or the deflection axle have a plurality of markings spaced at predefined intervals, and at least one travel difference or time difference between two markings is determined. The determined difference is compared to a setpoint value and the drive axle is stopped when a deviation between the setpoint value and the determined difference exceeds a threshold value.

20 Claims, 6 Drawing Sheets

(56) References Cited

U.S. PATENT DOCUMENTS

| | | | |
|---|---|---|---|
| 7,856,891 B2* | 12/2010 | Kirst | B67C 3/20 |
| | | | 73/861.355 |
| 8,247,711 B2* | 8/2012 | Troisi | B67C 3/202 |
| | | | 177/145 |
| 8,284,993 B2* | 10/2012 | Taylor | B65G 43/10 |
| | | | 198/300 |
| 8,297,908 B2* | 10/2012 | Savoia | B65G 47/252 |
| | | | 198/403 |
| 8,943,779 B2* | 2/2015 | Amano | H04N 7/18 |
| | | | 348/86 |
| 9,186,884 B2* | 11/2015 | Landa | B41J 2/0057 |
| 2002/0104741 A1* | 8/2002 | Buckley et al. | |
| 2005/0262803 A1* | 12/2005 | Monti | |
| 2008/0257692 A1 | 10/2008 | Wallace | |
| 2010/0155471 A1* | 6/2010 | Heinz et al. | |
| 2011/0214965 A1* | 9/2011 | Murphy | |
| 2012/0228083 A1* | 9/2012 | Terzini | |
| 2013/0042943 A1* | 2/2013 | Bassani | |
| 2013/0101377 A1* | 4/2013 | Hawkes et al. | |

FOREIGN PATENT DOCUMENTS

| | | |
|---|---|---|
| DE | 102007047828 A1 | 6/2009 |
| WO | 2013/034504 A1 | 3/2013 |

* cited by examiner

SYSTEMS AND METHODS FOR PACKAGING DEVICES

BACKGROUND

The present disclosure relates to a method for operating a packaging device for individual pharmaceutical portions, and a packaging device which may be implemented using this method.

Packaging devices, also referred to as blister machines, are known from the prior art. For example, WO 2013/034504 A1 describes a blister machine which is usable in pharmacies, hospitals, or blister packaging centers, the blister machine putting together pharmaceutical compositions composed of multiple pharmaceutical portions for individual patient use according to medically prescribed administration times. The device packages, corresponding to the order dates, pharmaceutical compositions consisting of a single portion or a plurality of individual pharmaceutical portions into bags, so-called blister bags, which are formed from a packaging material web. These bags leave the packaging device as a strand of blister bags (also referred to as a blister tube) for further use.

A blister bag generally corresponds to an administration time for a patient (e.g., it contains all pharmaceutical portions which a patient must take at a specified time of day). The known packaging device for individual pharmaceutical portions includes a plurality of supply and dispensing units for pharmaceutical portions which cooperate with a plurality of guide units, which are moved past the supply and dispensing units by means of a transport unit. From the guide units, the pharmaceutical portions are customarily supplied to a packaging station in which the above-mentioned blister bags are formed and the individual pharmaceutical portions are introduced into the blister bags during forming of same. Due to the use of the plurality of supply and dispensing units and the use of a plurality of guide units which are moved past the supply and dispensing units, numerous different pharmaceutical compositions, which all may contain all pharmaceutical portions stored in the supply and dispensing units, may be prepared at the same time.

The number of pharmaceutical compositions which may be prepared at the same time as well as the number of different pharmaceutical portions which may be stored at the same time may be set via the number of supply and dispensing units used in the packaging device, and the number of guide units moved past same. For the case that a different pharmaceutical is stored in each supply and dispensing unit, the number of pharmaceuticals that may be stored in the packaging device corresponds to the number of supply and dispensing units included in the packaging device. However, since various pharmaceuticals are requested with different frequencies, it is generally the case that various pharmaceuticals are stored in several of the supply and dispensing units.

The transport unit for moving the guide units along the supply and dispensing units has at least one transporter to which the guide units are fastened. This transporter may be configured, for example, as a toothed belt which moves between a drive axle and a deflection axle and which has a plurality of mountings to which the guide units are fastened. The supply and dispensing units are often situated in a matrix, i.e., multiple supply and dispensing units are situated one on top of the other. The guide units have a corresponding configuration, and have a plurality of receiving openings which correspond to delivery openings of the supply and dispensing units, and a transfer of pharmaceutical portions from the supply and dispensing units to the guide units can take place when the delivery openings are aligned with the receiving openings. Due to the matrix-like configuration of the supply and dispensing units, the guide units have a certain installation height and thus a certain weight. The total weight of the guide units used is significant, depending on the number of guide units, so that the transporter of the transport unit is under considerable stress, and a substantial expenditure of energy is necessary for the drive, i.e., the movement of the guide units.

In particular for packaging devices having a plurality of guide units, and the stress on the transporter which is thus necessary, it is possible that the transporter may rupture. Without the corresponding counterforce, the transporter together with the associated guide units is pulled "unguided" through the packaging device via the drive axle, and during this unguided motion the guide units may become wedged inside the packaging unit and cause significant damage in the packaging unit.

In many medical treatment settings, it is desirable to provide a packaging device and a method for operating a packaging device for individual pharmaceutical portions, in which the risk of damaging the packaging device during a malfunction of a transporter of the guide units is reduced.

SUMMARY

One or more disclosed embodiments provide a method for operating a packaging device for individual pharmaceutical portions. The method includes moving a plurality of guide units fastened to at least one transporter of a transport unit along a plurality of supply and dispensing units, delivery openings of the supply and dispensing units being aligned with receiving openings of the guide units, the at least one transporter being driven by a drive axle coupled to a motor and returned via a deflection axle, the motor being coupled to a control unit. The method also includes determining at least one travel difference or time difference between two markings of the at least one transporter in the peripheral direction or the deflection axle having a plurality of markings spaced at predefined intervals. The method further includes comparing the determined difference to a corresponding setpoint value, the setpoint value corresponding to a difference when the transport unit functions without error. The method also includes stopping the drive axle when a deviation between the setpoint value and the determined difference exceeds a threshold value.

One or more disclosed embodiments provide a packaging device for individual pharmaceutical portions. The packaging device includes a plurality of supply and dispensing units, a control unit, a drive axle, a deflection axle, and a motor coupled to the control unit and a transport unit having at least one transporter, the at least one transporter driven by the drive axle coupled to the motor and returned via the deflection axle, wherein at least one of the deflection axle and the at least one transporter has markings. The packaging device also includes a plurality of guide units fastened to the at least one transporter and having a plurality of receiving openings aligned with delivery openings of the plurality of supply and dispensing units when the guide units move. The packaging device further includes a packaging unit supplied with pharmaceutical portions via the guide units and a sensor system coupled to the control unit, the sensor system and control unit configured to determine a travel difference and a time difference between two markings. Also, the control unit is configured to compare the determined difference to a setpoint value, wherein the setpoint value corresponds to a determined difference for an error-free transport unit, and wherein the control unit stops the drive axle when a deviation that exceeds a threshold value is determined.

One or more disclosed embodiments provide a method for operating a packaging device for individual pharmaceutical portions. The method includes driving a transporter of a transport unit with a drive axle coupled to a motor and returning the transporter with a deflection axle. The method also includes moving a plurality of guide units fastened to a transporter of a transport unit along a plurality of supply and dispensing units to align delivery openings of the supply and dispensing units with receiving openings of the guide units and determining a difference between two markings of one of the transporter and the deflection axle. The method further includes comparing the determined difference to a corresponding setpoint value, the setpoint value corresponding to a determined difference associated with the transport unit functioning without error and stopping the drive axle when a deviation between the setpoint value and the determined difference exceeds a threshold value.

BRIEF DESCRIPTION OF THE DRAWINGS

The device according to the present disclosure and the method according to the present disclosure are described in greater detail below, with reference to the appended drawings, wherein.

DETAILED DESCRIPTION

Figure 1:
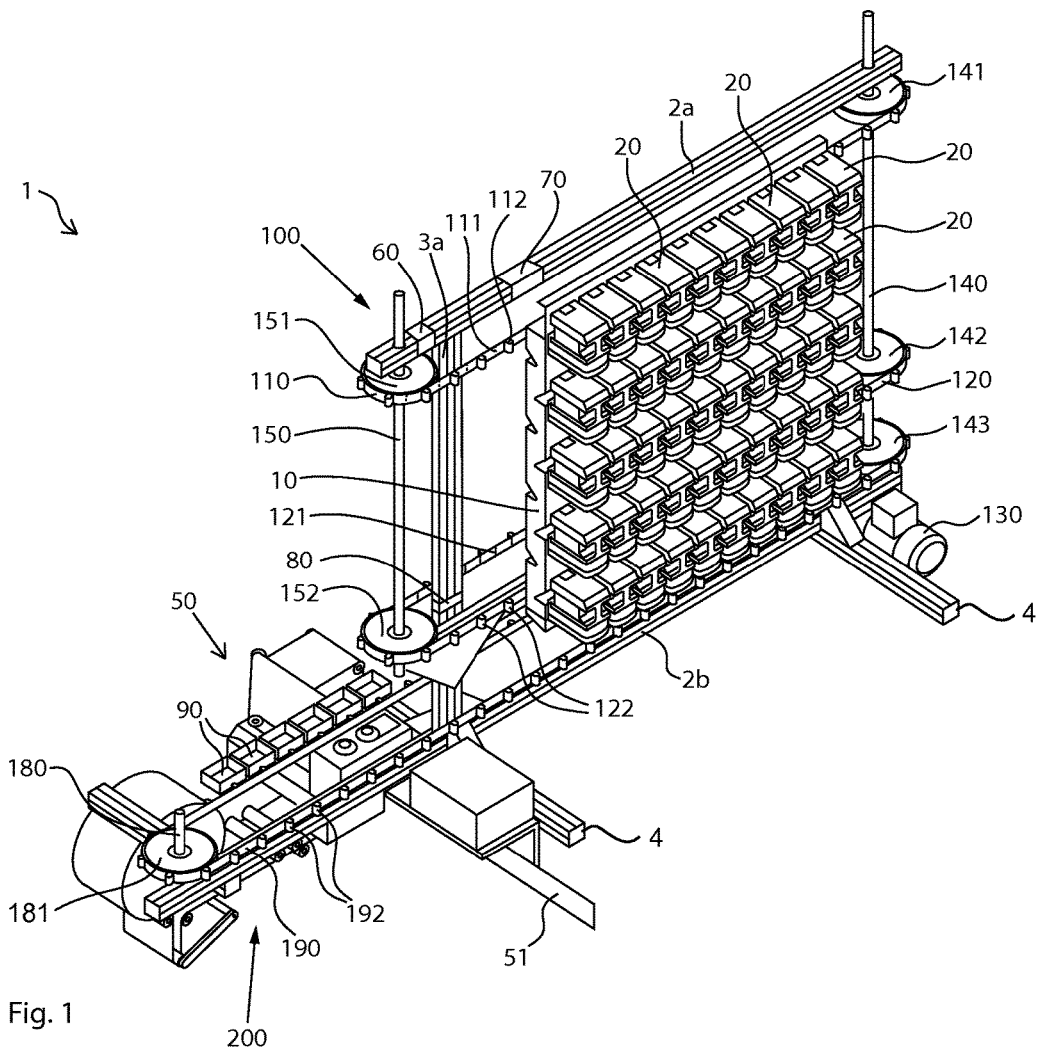
FIG. 1 is a perspective view of an embodiment of a packaging device.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

The packaging device used in the method according to the disclosure may include multiple guide units that are fastened to at least one transporter of a transport unit. The guide units may be moved along multiple supply and dispensing units in which pharmaceutical portions may be stored, whereby delivery openings of the supply and dispensing units are aligned with receiving openings of the guide units. The at least one transporter of the transport unit may be driven by a drive axle which is coupled to a motor and returned via a deflection axle, while the motor may be coupled to a control unit. The transporter may have a plurality of markings spaced at predefined intervals in the peripheral direction, and/or the deflection axle may have a plurality of markings spaced at predefined intervals.

At least one travel difference or time difference (hereinafter "difference") between two markings may be determined, the determined difference may then be compared to a corresponding setpoint value, where the setpoint value corresponds to the difference when the transport unit is functioning without error, and the drive axle is stopped when a deviation between the setpoint value and the determined difference is ascertained which exceeds a threshold value.

The markings on the transporter and/or the deflection axle may be markings which are detected, for example, by a proximity sensor (e.g., a sensor system which functions contact-free without direct contact with the markings). Inductive, capacitive, magnetic, or optical proximity sensors may be used, depending on the specific procedure of the method and the configuration of the packaging devices used for carrying out the method. In one or more embodiments, photoelectric barriers, for example, may be used that detect entry of a marking. In an error-free transport unit, the transporter may move at a predefined speed between the drive axle, driven by the motor, and the deflection axle. In the process, the motor for moving the transporter expends a certain force, and there is a certain stress in the transporter. Due to the uniform movement of the transporter, between predefined markings, time differences that lie in a certain range around a predefined setpoint value may be continually measured.

If the transporter now ruptures (e.g., due to the high tensile stress), the movement speed of the transporter changes, and the speed of the transporter may be less or greater than the setpoint value, depending on the location of the rupture and the detection of the time difference. For example, in the event of a rupture the speed of the transporter may increase or decrease as a function of the location, but in any case the time difference deviates from a predefined setpoint value. As soon as such a deviation is recorded, the drive shaft may be stopped to prevent further movement of the transporter, and thus of the guide units, through the packaging device.

The markings may be provided on the transporter itself and/or on the deflection axle. The markings may be provided, for example, by components which are spaced apart on the deflection roller or on a transporter. It is also contemplated that both markings are provided by only one component, whereby the "beginning" and the "end" of the component is determined. The difference may then be determined based on values associated with the "beginning" and the "end."

The time difference between two predefined markings on the deflection axle will also change when there is a rupture of the transporter. For example, the rotational speed will change and a rupture may be detected based on the markings on the deflection axle.

In one or more embodiments, the travel difference between two markings may be determined. Position values of the motor and/or of the drive axle may be utilized for this purpose.

The motor coupled to the drive axle undergoes a predefined number of rotary steps (e.g., number of steps per revolution) during one full revolution of the drive axle, the instantaneous position being increased with each rotary step. After one full revolution is completed, the instantaneous position of the motor and/or of the drive axle may be set to zero, or it may simply be continually further increased without resetting.

For determining the travel difference, the instantaneous position of the motor or of the drive axle during detection of the first marking and the instantaneous position of the motor or of the drive axle during detection of the second marking may be compared. For example, during error-free functioning of the transport unit, the determined difference always corresponds to the setpoint value, taking a certain error tolerance into account. When there is a malfunction, this results in a deviation due to a retardation or acceleration of the deflection axle or of a transporter. For example, if the transporter slows down, more rotary steps than usual are determined between two markings, since the motor and the drive axle continue to move "normally," but the markings move more slowly, and therefore more rotary steps have passed by before the second marking is detected.

Accordingly, the movement of the guide units through the packaging device may be automatically stopped when a malfunction of the transport unit is determined. The malfunction may be determined based on deviations of a difference between two markings which are provided on the transporter and/or the deflection roller. For example, if a packaging device for carrying out the method according to the disclosure includes only one transporter, the difference between two predefined markings on the transporter or between two markings on the deflection axle may be detected.

However, if only one transporter is present, the situation may arise that a second marking is never reached (e.g., when the malfunction results in the transporter abruptly stopping). Although such an abrupt stop is unlikely, in order to still be able to determine such an occurrence it is provided in one or more embodiments that during the determination of the travel difference or time difference between two markings, the determination may be ended after a predefined termination value is exceeded and the drive axle is stopped. This termination value may correspond, for example, to the sum of the setpoint value and the threshold value. However, other values may also be specified. In any event, it may be ensured that in a case as described above, the control unit does not wait "too long" for the determination of the second marking. Also, in such a case it may be ensured that the transport unit is stopped after a certain time or a certain rotational speed of the drive axle or of the motor in order to avoid damage within the device, for example.

If the device includes at least two transporters, which may be preferred on account of the height of the guide units, the difference between two markings on the same transporter may be determined. It is also contemplated to determine the difference between two predefined markings which are situated on different transporters (e.g., between a first marking on a first transporter and a second marking on a second transporter). During a determination of the difference between two markings on different transporters, it is possible to determine not only the rupture of a transporter, in which the difference abruptly deviates from the setpoint value, but also to determine slow slippage in one of the transporters, which may result in a gradual tilted position of the guide units and in turn result in the guide units catching in the transport unit and causing more or less damage to it.

Since the damage which occurs in the event of a rupture of a transporter may be significant, in one or more embodiments of the method in which the transport unit includes multiple transporters, it is provided that differences between two markings of at least two transporters may be determined. The determined differences may be compared to a corresponding setpoint value and/or to one another, where the setpoint value corresponds to the difference for error-free functioning of the transport unit. When a deviation between a setpoint value and a determined difference or between the differences themselves is ascertained that exceeds a threshold value, the drive axle may be stopped. Thus, the differences between markings on both transporters may be monitored so that the rupture of one of the two transporters may be detected very quickly. Also, the differences themselves may be compared. When the transport units are functioning without error, and with an appropriate selection of the markings, these differences are approximately equal, and deviate from one another only slightly. If one of the transporters ruptures, the differences between two predefined markings on the transporter also deviate from one another, so that this value may also be used to stop the packaging device.

It is provided that the drive axle may be stopped when a deviation is determined that exceeds a threshold value. In one or more embodiments, it is also provided that the drive axle and the deflection axle are stopped when a deviation is determined that exceeds a threshold value. Depending on the exact configuration of the deflection axle and of the transporter, due to the friction that is present at least between the surface of the deflection axle and the surface of the transporter, it may be ensured that the transporter is stopped also in the area of the deflection axle, which is advantageous in particular for packaging devices which have very long transporter. For stopping the deflection axle, the deflection axle may have a lock that is triggered by the control unit when a deviation is determined that exceeds a threshold value.

In one or more embodiments in which the transport unit has at least one transporter guide, it is provided that in addition, the movement of a transporter for the at least one transporter guide may be stopped when a deviation is determined which exceeds a threshold value. Carrying out the method in a corresponding manner may be particularly appropriate when very long transporters are used, as they may possibly require a horizontal support. The transporter guide, which is engaged with the transporter that it guides, whether solely due to friction or, for example, via toothing on the inner face of the transporter and on the transporter guide, may have a braking effect on the transporter when a deviation is determined that exceeds a threshold value, thus further reducing damage to the packaging device.

As already indicated, the difference between the markings provided may be determined with multiple sensor systems, the selection depending on the specific configuration of the packaging device. Any suitable sensor systems may be used.

In one or more embodiments, the markings of the deflection axle may be provided by teeth of a deflection roller of the deflection axle. Although use of a deflection roller and use of a transporter having corresponding toothing may be preferred, this is generally the case with regard to the need for the drive of the transporter. Due to use of the teeth of the deflection roller as markings, it is not necessary to provide additional markings besides the ones that are already present. Accordingly, in one or more embodiments it is provided that the markings of a transporter are provided by teeth on toothing of the transporter, whereby the teeth may cooperate with teeth of a deflection roller of the deflection axle, although this is not required. The markings used for determining a travel difference or time difference may be provided by one tooth (e.g., beginning and end of the tooth) or two teeth on the deflection roller or the transporter.

On account of the matrix-like configuration of the supply and dispensing units, the guide units are guided vertically through the packaging device. Due to the need for moving the guide units on the at least one transporter, the guide units have a certain spacing from one another, at least in the area of the deflection axle. During error-free functioning of the transport unit, the guide units are guided through the packaging device in parallel to one another. A tilted position of the guide units indicates a malfunction that is caused by slippage in one of the transporters when multiple transporters are used, or by the rupture of a transporter. In one or more embodiments of the method, the markings of a transporter are provided by edges of guide units which are fastened to the transporter. In each case, two edges of a guide unit may form a marking.

When the difference between the two markings is measured with a photoelectric barrier, for example, the gap between two parallel guide units may be utilized for measuring the difference. When the vertical alignment of the guide unit on the at least one transporter is uniform, the vertical parallel spaces between the guide units are very similar, taking certain construction-related deviations into account, so that the differences do not deviate from one another significantly. When a tilted position of the guide units occurs due to slippage on a transporter or the rupture of a transporter, due to the changed alignment of the clearance space only another difference may be measured by the measuring unit, and if the deviation from the setpoint value exceeds a threshold value, this may be used for determining a malfunction of the transport unit that may result in stopping of the drive axle.

A packaging device according to the disclosure may include multiple supply and dispensing units in which in each case one type of pharmaceutical portions is stored, and a transport unit having at least one transporter. The at least one transporter of the transport unit may be driven by a drive axle that is coupled to a motor, and returned via a deflection axle, the motor being coupled to a control unit.

The packaging device may also include multiple guide units that are fastened (e.g., optionally detachably, to the at least one transporter and which have multiple receiving openings which are aligned with or moved past delivery openings of the supply and dispensing units when the guide units move, and at least one packaging unit that is supplied with pharmaceutical portions via the guide units. This packaging unit transfers the pharmaceutical portions, typically into the blister bag already described above. The packaging unit may be situated within the packaging device or in a component which is separate from the actual packaging device.

The transporters in the peripheral direction and/or the deflection axle have/has markings, and the packaging device includes at least one sensor system, coupled to the control unit, with which differences between two markings may be determined. As already discussed with reference to the method, these two markings may be two markings on the deflection axle, two markings on a transporter, or two markings, one each on a different transporter.

The control unit may be configured in such a way that the determined difference may be compared to a setpoint value, the setpoint value corresponding to the difference for an error-free transport unit, and that the control unit stops the drive axle when a deviation is determined which exceeds a threshold value. The sensor system may be, for example, any proximity sensor, the exact configuration of the sensor system once again depending on the configuration of the packaging device per se. For example, the sensor systems already described with reference to the method are suitable sensor systems.

In one or more embodiments of the packaging device, the transport unit may have at least two transporters, where a sensor system with which a difference between two markings of a transporter is determinable is associated in each case with the at least two transporters. The control unit may be configured in such a way that the determined differences may be compared to a setpoint value and/or to one another, and that the control unit stops the drive axle when a deviation is determined which exceeds a threshold value. The two transporters may be monitored for a rupture, thus ensuring that damage based on a rupture of a transporter is prevented to the greatest extent possible. Alternatively or additionally, the deviations of the two determined similar differences of the same type (e.g., two travel differences or two time differences) from one another may be taken into account, which may further increase security.

The packaging device may include at least one transporter guide which is coupled to the control unit, and which may stop the movement of a transporter when a deviation is determined which exceeds a threshold value. The transporter guide may thus likewise contribute toward quickly and reliably stopping the transporter when a rupture is determined, thus avoiding damage in the packaging device.

The markings of the deflection axle may be provided by teeth of a deflection roller of the deflection axle, for example. Thus, components which are provided anyway for operating the transport unit may be used as markings such that no additional components are necessary for providing the markings. As another example, the markings of a transporter may be provided by teeth of toothing on the transporter.

The markings of a transporter may be provided by edges of guide units that are fastened to the transporter. As already discussed above, it is possible to determine a tilted position of the guide unit that indicates a malfunction of the transport unit, which may be caused by a rupture of a transporter or by slippage on a transporter.

FIG. 1 shows a packaging device 1 for which numerous components of the packaging device 1 that are not essential to the disclosure (such as external trim elements, for example) are omitted. The packaging device 1 may include a central support structure having a horizontal top support element 2a and a horizontal bottom support element 2b. The two horizontal support elements may be connected to one another via two support elements 3a and 3b (see FIG. 2), which are customarily vertical. Situated below and orthogonally with respect to the bottom horizontal support element 2b are support elements 4, via which the illustrated section of the packaging device 1 may be fastened to external further support elements (not shown). Shown in the right front portion of the packaging device 1 are multiple supply and dispensing units 20, configured in a matrix-like manner, in which in each case a plurality of pharmaceutical portions may be stored, and which may be fastened to further components of the packaging device 1 which are not essential to the disclosure. Multiple guide units 10, of which only one guide unit 10 is apparent in FIG. 1, may be situated or disposed "behind" the plurality of supply and dispensing units 20.

The guide units 10 may be attached to fasteners 112, 122 of two transporters 110, 120, respectively, of a transport unit 100. The transporters 110, 120 may be revolving transport conveyors or transport belts that are guided by drive rollers 141, 142 of a drive axle 140 and deflection rollers 151, 152 of a deflection axle 150.

The drive axle 140 may be coupled to a motor 130, and may be moved and stopped by the motor 130. The motor 130 in turn may be coupled to a control unit (not illustrated in FIG. 1), and may transmit an instantaneous motor position to the control unit, whereby the motor position may be used for determining a travel difference between two markings. For this purpose, the motor position may be determined during detection of the first and second markings, and based on these two values a difference may be determined, which may then compared to a setpoint value.

Situated below the transport unit 100 is a collective transport unit 200 which likewise includes a transporter 190, which may also be configured as a revolving transport belt. This transport belt may be driven via a drive roller 143, which may likewise be driven by the drive axle 140 described with reference to the transport unit 100. The transport belt may also engage with a drive roller 182 having a deflection axle 180 at the other end of the transporter 190. The transporter 190 may include multiple fasteners 192, on each of which a collection unit 90 may be situated.

The drive roller 143 of the collective transport unit 200 and the drive rollers 141, 142 of the transport unit 100 may be fastened to the same drive axle 140, so that the transporter of the transport unit 100 and of the collective transport unit 200 are moved at the same speed (assuming the same radius for the drive rollers). The fasteners 112, 122, 192 of the transporters 110, 120, 190 of the two transport units 100, 200 may be oriented in such a way that the collection units 90 are moved below the guide units 10. For example, the pharmaceutical portions delivered into the guide unit 10 for the supply and dispensing units 20 may be transferred to the collection units 90, which are situated below the guide units 10 and moved at the same speed.

As is clearly apparent in FIG. 1, the transporters 110, 120 of the transport unit 100 do not extend over the entire "length" of the collective transport unit 200. Further components of the packaging device 1 may be situated in the area above the collective transport unit 200 in which the transport unit 100 does not extend. For example, it is contemplated to provide auxiliary dispensing units (not shown) in this area, specifically, for pharmaceutical portions which are requested so infrequently that storage in a supply and dispensing unit 20 is not meaningful.

A packaging unit 50 may be situated or disposed below the collective transport unit 200 in the "left" section of the packaging device 1. In the packaging unit 50, the pharmaceutical portions received in the collection units 90 may be blister-packed and led out from the packaging device 1 as a blister tube 51.

To be able to quickly detect a rupture of a transporter 110, 120, 190, the packaging device 1 may include three sensor systems 60, 70, 80. Differences between two predefined markings 121 of the transporter 120 may be detected with the sensor system 80 situated on the vertical support element 3a. The same applies for differences between two predefined markings 111 of the transporter 110 for the sensor system 70 situated on the top horizontal support element 2a. Differences between two predefined markings (not shown) of the deflection roller 151 of the deflection axle 150 may be determined with the sensor system 60 situated in the area of the deflection roller 151 on the top support element 2a. The teeth themselves (the difference between two teeth) or two points of a tooth (beginning and end of the tooth and the difference between them) may be suitable as markings. As already described, the control unit may compare the determined differences to setpoint values, and as soon as a deviation which exceeds a threshold value is established, the two transporters 110, 120 may be stopped via the drive axle 140.

Figure 2:
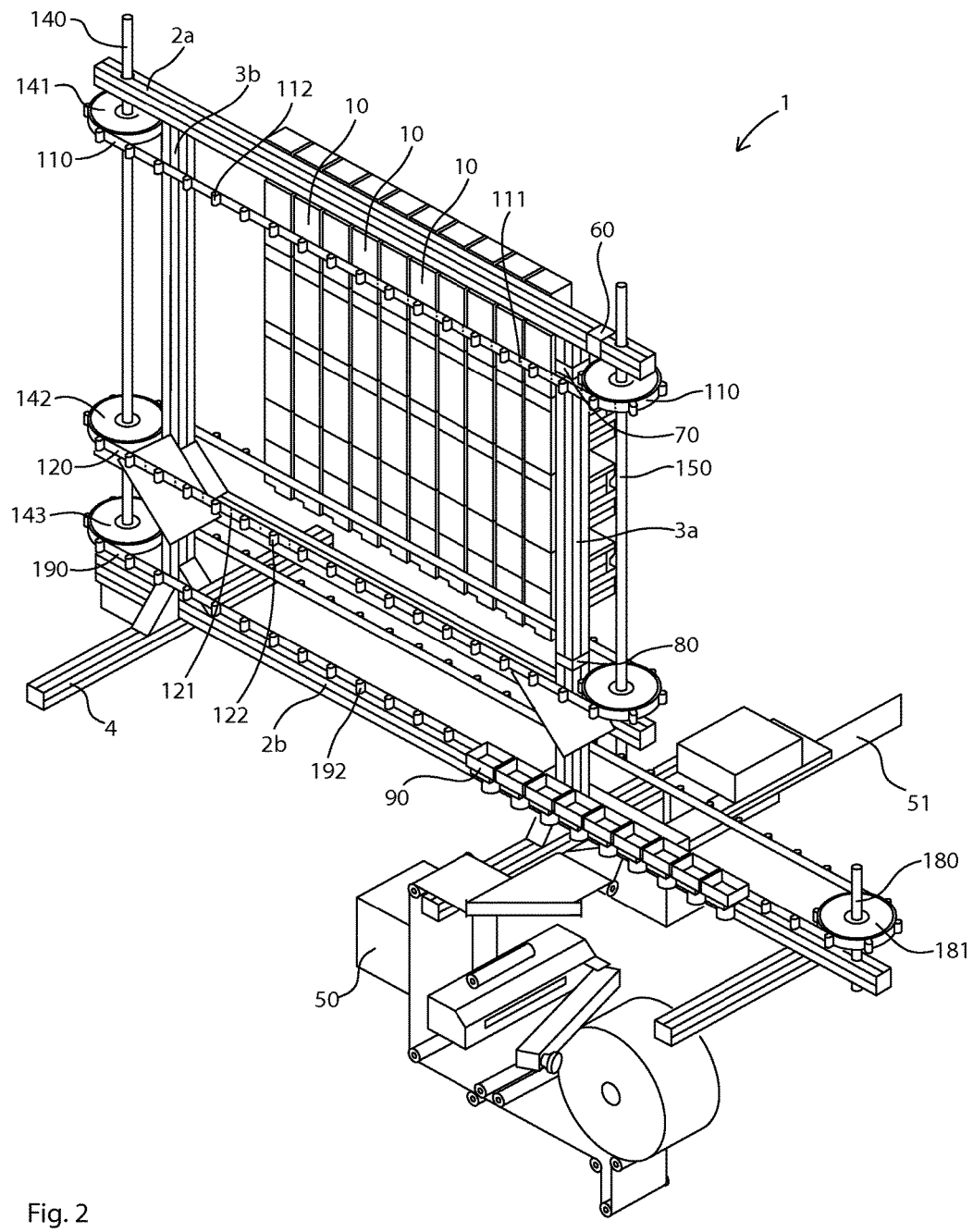
FIG. 2 is a perspective view of an embodiment of the packaging device.

In FIG. 2, the arrangement of the sensor systems 60, 70, 80 differs slightly from the packaging device 1 shown in FIG. 1, where the sensor systems 70, 80, are situated on the vertical support element 3a.

In particular the parallel arrangement of the multiple guide units 10 is apparent in FIG. 2, of which only a few on the "rear" side of the packaging device 1 are illustrated. A guide unit 10 may customarily be situated on all retaining elements 112, 122.

In each case illustrated in FIGS. 1 and 2, three sensor systems 60, 70, 80 are provided, two of which detect time differences between markings of the transporter and a difference in markings on the deflection axle 150 or deflection roller 151, 152. It is contemplated to use only one sensor system, in particular when a transport unit having only one transporter is provided. However, as already indicated, due to the length of the guide units 10 it is customary to use at least two transporters. In addition, the collective transport unit 200 has been illustrated only as an example. Thus, it is also contemplated for the revolving guide units 10 to deliver all pharmaceutical portions collected at a certain point in the packaging device 1 to a further unit, via which the pharmaceutical portions are supplied to a packaging unit.

Figure 3:
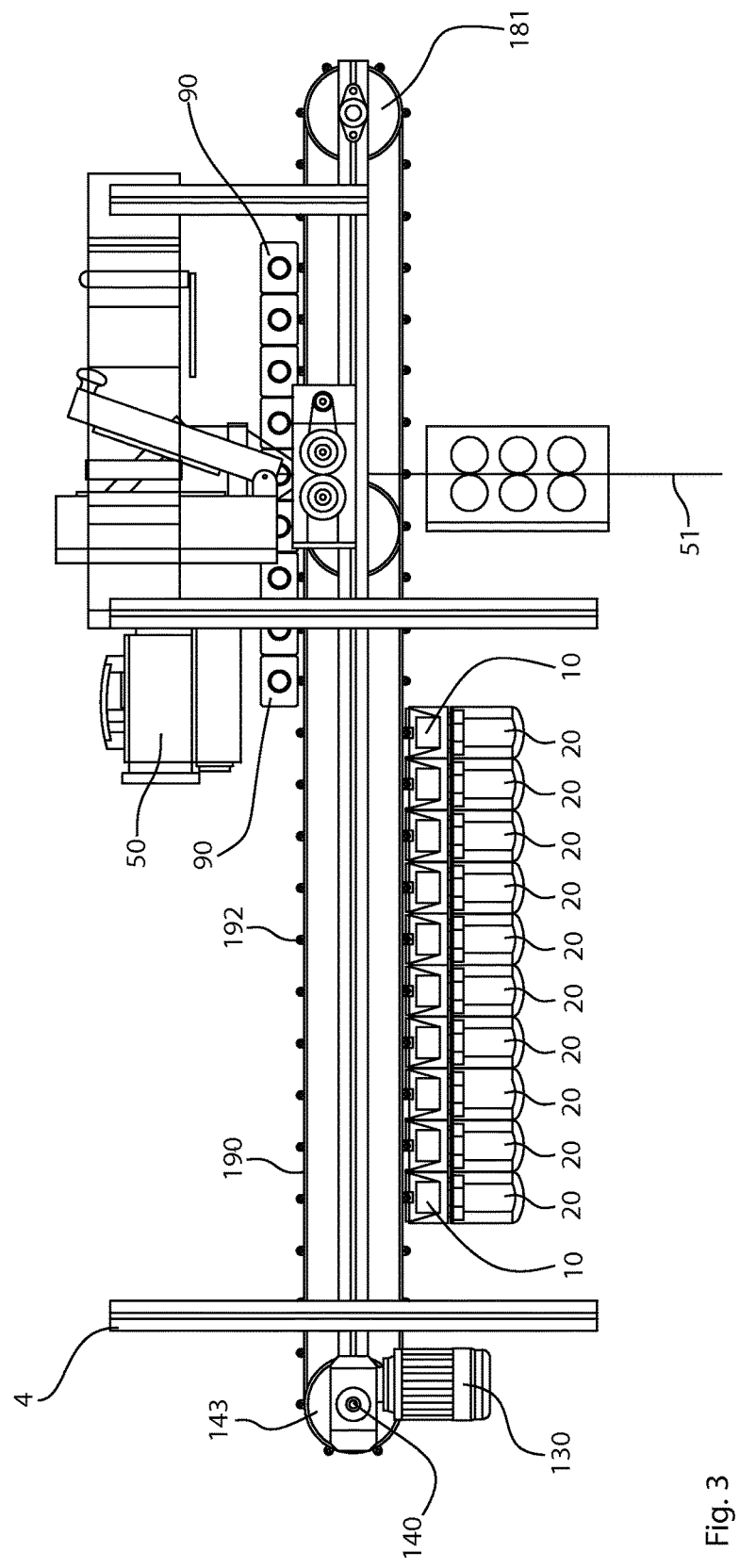
FIG. 3 is a bottom view of the packaging devices of FIGS. 1 and 2.

FIG. 3 illustrates in particular the arrangement of the guide units 10 in relation to the supply and dispensing units 20. As is apparent in the illustration shown, all of the illustrated guide units 10 may be aligned with an oppositely situated supply and dispensing unit 20 (the collection units 90 are omitted in this area), and the transfer of the pharmaceutical portions from the supply and dispensing units 20 to the guide units 10 may take place in the illustrated alignment of the guide units 10 with the supply and dispensing units 20. Depending on the movement direction of the transporter 190, the guide units 10 are moved "left" or "right" in relation to the supply and dispensing units 20, and as soon as a guide unit 10 has arrived at a subsequent supply and dispensing unit 20, pharmaceutical portions may be transferred anew into this guide unit 10. In the bottom view shown, it is pointed out that the supply and dispensing units 20 are situated in a matrix (e.g., multiple further supply and dispensing units 20 are situated "above" the illustrated supply and dispensing units 20 as shown in FIG. 1).

Figure 4:
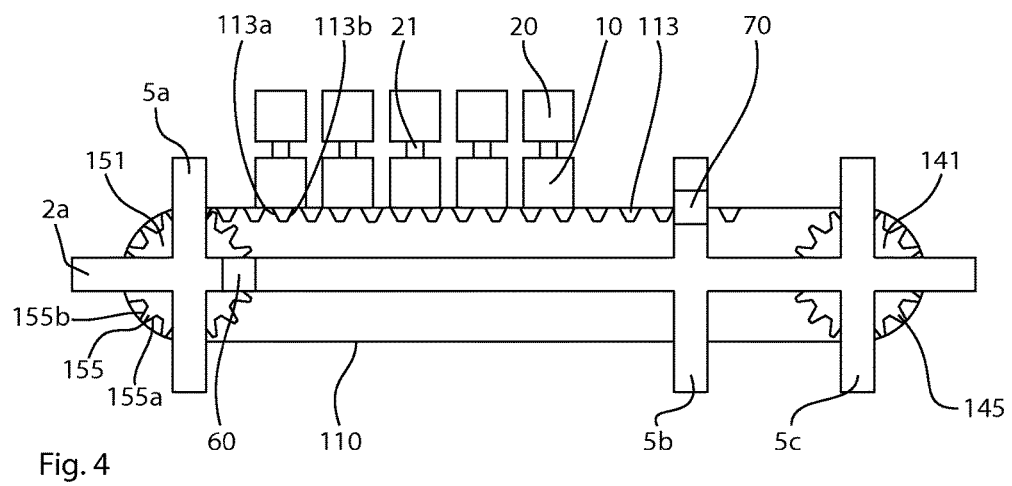
FIG. 4 is a schematic top view of an embodiment of a packaging device.

FIG. 4 shows the support structure for the top horizontal support element 2a having further support elements 5a, 5b, 5c that are situated orthogonally with respect to the support element 2a, and to which the transport unit 100 may be fastened within the packaging device 1. The transporter 110 may have a plurality of teeth 113 of toothing situated on the inner periphery of the transporter 110. The deflection roller 141 and the drive roller 151 likewise may have a plurality of teeth 145, 155, respectively, which are engaged with the teeth of the transporter. The teeth 113 as well as the teeth 155 of the transporter 110 and of the drive roller 151 may be used as markings, whereby differences may be determined between two predefined markings using the sensor systems 60, 70, and these differences may be in turn compared to a predefined setpoint value. Also, the "beginning" of a tooth (113a, 155a) and the "end" of the same tooth (113b, 155b) may be used for determining a difference. For example, the two markings necessary for the determination are not provided by two separate components (e.g., two teeth in this case), but instead, by the same component (e.g., one tooth).

In strictly practical terms, the situation may be such, for example, that the beginning of a tooth 113a, 155a (e.g., first marking) may be recorded by the corresponding sensor system 60, 70 as a positive flank, and the end of the tooth 113b, 155b (e.g., second marking) may be recorded as a negative flank. A time difference or a travel difference between these flanks may be determined, the position of the motor 130 or of the drive axle 140 at the time of the positive flank and negative flank being used for determining the travel difference.

In this illustration it is indicated that guide units 10 are situated on the outer periphery of the transporter 110, and in this illustration as well the guide units are depicted in the transfer position with respect to the supply and dispensing units 20. A delivery opening 21 of a supply and dispensing unit 20 is likewise indicated in this illustration. The delivery opening 21 aligns with a receiving opening 11 of the guide unit 10 (see FIG. 5).

Figure 5:
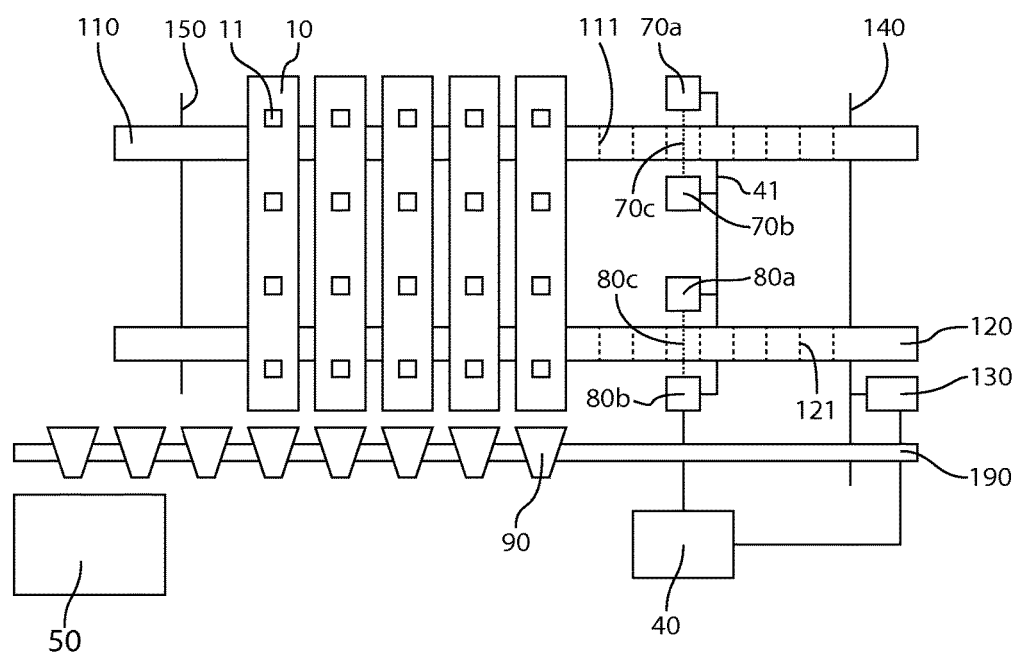
FIG. 5 is a schematic side view of the packaging device of FIG. 4.

In FIG. 5, two transporters 110, 120 are shown where a sensor system 70, 80 is associated with each of the transporters 110, 120. The sensor systems 70, 80 may be configured as photoelectric barriers, each having a transmitter unit 70a, 80a and a receiver unit 70b, 80b providing a light beam 70c, 80c. Differences between the markings 111 and 121 may be determined with the sensor systems 70, 80. These markings may be, for example, the teeth of the toothing at the inner periphery of the transporter 110, 120, as illustrated in FIG. 4. As illustrated, the sensor systems 70, 80 may be coupled via a line 41 to a control unit 40, which in turn may be coupled to a motor 130 that drives and stops the drive axle 140.

The collective transport unit 200 together with a transporter 190, on which multiple collection units 90 may be situated, may be situated below the actual transport unit 100. As is apparent, the collection units 90 may be aligned with the guide units 10. Here, the transporter 190 of the collective transport unit 200 as well as the two transporters 110, 120 of the actual transport unit 100 may be moved via the same drive axle 140 with drive rollers of equal size, so that the collection units 90 move at the same speed as the guide units 10. Thus, in the area in which the transport unit 190 extends above the collective transport unit 200, pharmaceutical portions may be continually transferred from the guide unit 10 into the collection units 90. The packaging unit 50, in which pharmaceutical portions may be transferred from the collection units 90 and blister-packed, is schematically illustrated on the "left" side, below the collective transport unit 200.

Figure 6A:
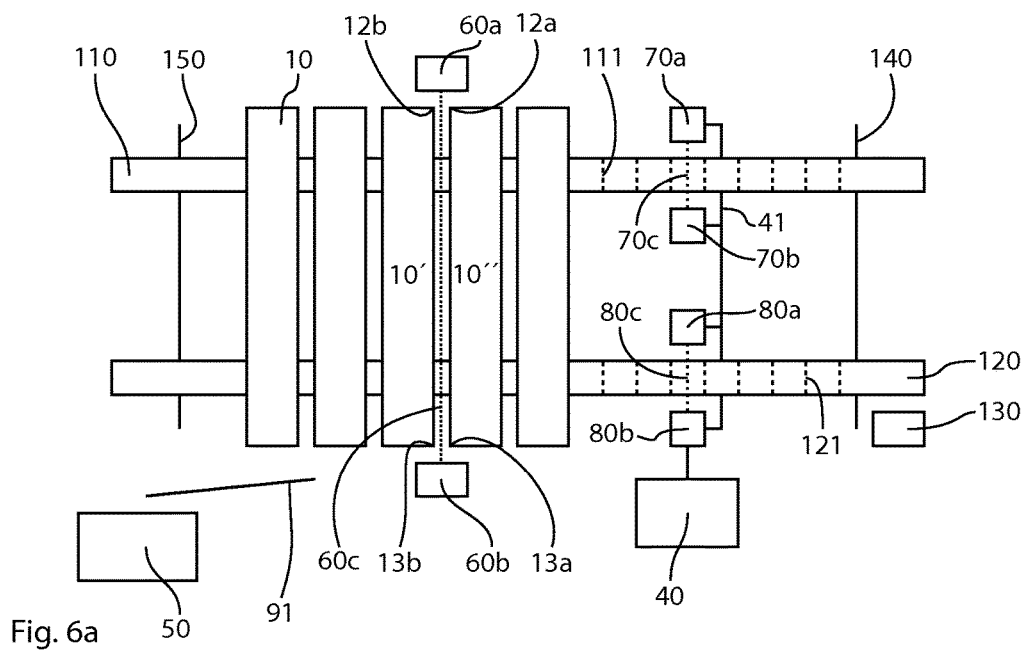
FIGS. 6A and 6B are schematic side views of an embodiment of a packaging device.
Figure 6B:
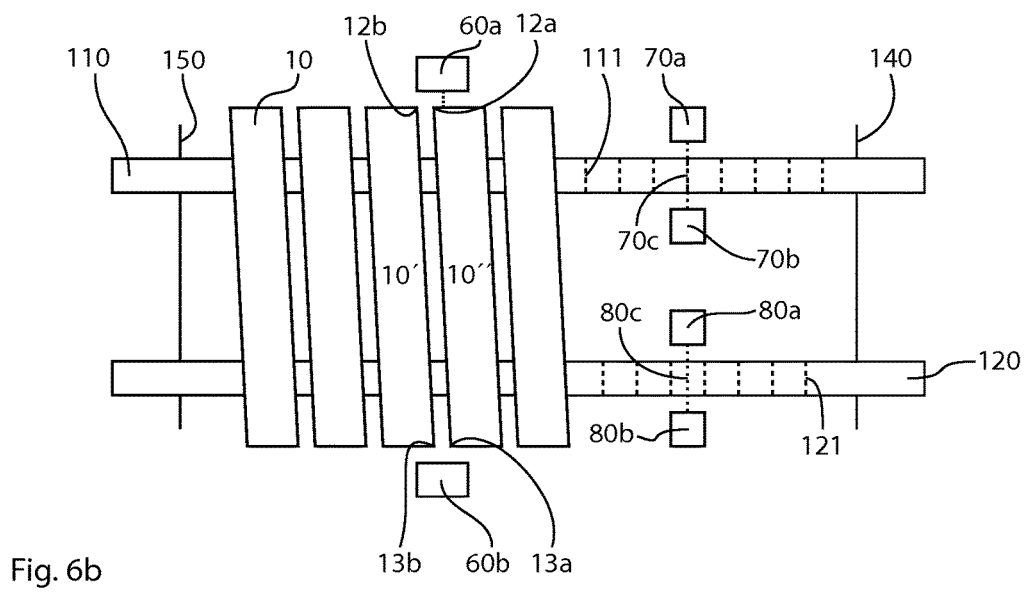

FIGS. 6a, 6b show three sensor systems 60, 70, 80, where markings used for determining a difference are provided, among other elements, by edges 12a, 12b, 13a, 13b of two adjoining guide units 10' and 10". In FIG. 6a the guide units 10 are aligned vertically parallel and at a distance from one another, this illustration representing the error-free state of the packaging device 1. The sensor system 60 may be configured, for example, as a photoelectric barrier having a transmitter unit 60a and a receiver unit 60b, whereby the distance between the adjoining guide units 10', 10" (e.g., the difference between interruptions of the light beam 60c) may be determined via the photoelectric barrier.

The sensor systems 70, 80 may be configured not to determine differences between two markings on the same transporter, but rather to determine differences between two markings on the two transporters 110, 120, respectively. As is apparent in FIG. 6a, the markings 111, 121 of the two transporters 110, 120, respectively, may be situated perpendicularly with respect to one another without an offset. This arrangement has been selected strictly as an example. Overall, a difference between two predefined markings may be measured while the arrangement of these markings relative to one another may not be relevant.

A malfunction of the packaging device 1 is illustrated in FIG. 6b. As is apparent, the guide units 10 are no longer in the vertical position, but rather are slightly inclined. This may be brought about by one of the transporters 110, 120 being ruptured, or by slippage in one of the transporters 110, 120 having taken place over a certain time period. As is apparent, due to the tilted or inclined position of the guide units 10', 10", the same difference (e.g., distance) between these guide units 10', 10" is no longer determinable via the sensor system 60. Thus, a comparison to a setpoint value results in a deviation which indicates a malfunction of the packaging device 1, whereupon the control unit 40 may stop the drive shaft 140. The same applies for the two sensor systems 70, 80, since, due to the offset of the markings 111, 121 which were formerly situated one on top of the other, the "same" differences between these markings is no longer determined. Instead, based on the schematic illustration, a difference may be determined that is only half as great.

As shown in FIG. 6a, the collective transport unit 200 may transfer the pharmaceutical portions from the guide units 10 to the packaging unit 50 at a certain location in the packaging device 1 via a pharmaceutical feed 91 configured as a chute, for example. For this purpose, the guide units 10 may have a closing mechanism (not shown) that is opened only when a guide unit 10 reaches a predefined position within the packaging device 1, for example.

Figure 7:
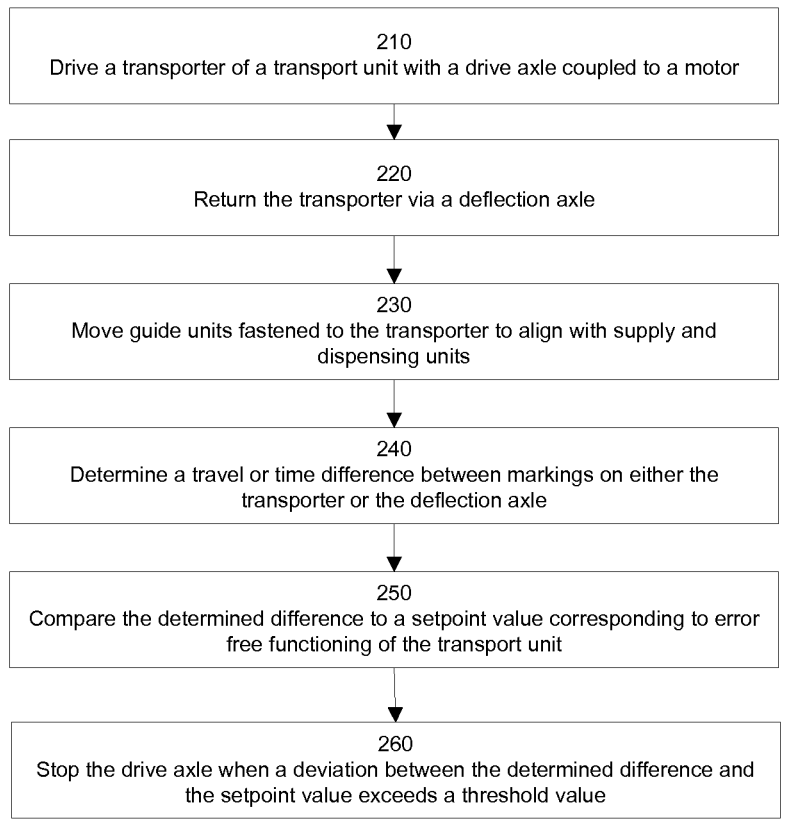
FIG. 7 is a flow chart illustrating steps in a method for operating a packaging device for individual pharmaceutical portions, according to some embodiments.

FIG. 7 shows a flow chart illustrating steps in a method 200 for operating a packaging device for individual pharmaceutical portions (e.g., medication packages), according to some embodiments. Method 200 may be performed in connection with a packaging device consistent with the present disclosure. Accordingly, the packaging device in method 200 may include a plurality of supply and dispensing units (e.g., supply and dispensing units 20) having delivery openings (e.g., delivery opening 21) that are aligned with receiving opening (e.g., receiving opening 11) of guide units (e.g., guide unit 10) through which medical items may be moved. The packaging device in method 200 may also include a motor (e.g., motor 130) coupled to a control unit (e.g., control unit 40), the motor driving a drive axle (e.g., drive axle 140) to move a transporter (e.g., transporter 110) that is returned by a deflection axle (e.g., deflection axle 150). The packaging device in method 200 may also include a sensor system (e.g., sensor system 70) coupled to the control unit and configured to determine differences between markings of the transporter and/or the deflection axle. Accordingly, the control unit compares the determined difference(s) to a setpoint value and stops the drive axle if the deviation between a determined difference and the setpoint value exceeds a threshold value.

Steps in method 200 may be performed at least partially by an operator, medical personnel, or a healthcare professional in a healthcare facility or in a drugstore, or in a pharma manufacturing facility. Accordingly, method 200 may be part of a medicament management or a drug logistic prepared by a physician or a healthcare professional. Moreover, method 200 may be performed automatically upon execution of a command provided by or controlled by a healthcare professional. For example, steps in method 200 may be programmed or directed with commands on computer-readable media, which, in some embodiments, can comprise non-transitory computer readable media.

Methods consistent with the present disclosure may include at least one of the steps illustrated in FIG. 7, performed in any order. In some embodiments, a method may include at least two of the steps illustrated in FIG. 7 performed overlapping in time, or even simultaneously. Moreover, embodiments consistent with the present disclosure may include at least one but not all of the steps illustrated in FIG. 7. Furthermore, methods consistent with the present disclosure may include more steps, in addition to at least one of the steps illustrated in FIG. 7. In some embodiments, one or more steps may be repeated.

Step 210 includes driving a transporter of a transport unit with a drive axle coupled to a motor. Step 220 includes returning the transporter via a deflection axle. Step 230 includes moving guide units fastened to the transporter to align with supply and dispensing units. In some embodiments, step 230 includes aligning delivery openings of the supply and dispensing units with receiving openings of the guide units in order to delivery medications from the supply and dispensing stations through the guide units to a collection unit. Step 240 includes determining a travel or time difference between markings on either the transporter or the deflection axle. Step 250 includes comparing the determined difference to a setpoint value corresponding to error free functioning of the transport unit. In some embodiments, step 250 includes comparing a determined difference of markings of a transporter or markings of a deflection axle to the setpoint value, or comparing determined differences of two transporters to each other. Step 260 includes stopping the drive axle when a deviation between the determined difference(s) and the setpoint value is determined to exceed a threshold value.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way.

The invention claimed is:

1. A method for operating a packaging device for individual pharmaceutical portions, the method comprising:
    moving a plurality of guide units fastened to at least one transporter of a transport unit along a plurality of supply and dispensing units, delivery openings of the supply and dispensing units being aligned with receiving openings of the guide units, the at least one transporter being driven by a drive axle coupled to a motor and returned via a deflection axle, the motor being coupled to a control unit;
    determining at least one travel difference or time difference between two markings of the at least one transporter in the peripheral direction or the deflection axle having a plurality of markings spaced at predefined intervals;
    comparing the determined difference to a corresponding setpoint value, the setpoint value corresponding to a difference when the transport unit functions without error; and
    stopping the drive axle when a deviation between the setpoint value and the determined difference exceeds a threshold value.

2. The method of claim 1, wherein during the determination of the travel difference or time difference between two markings, the determination is ended after a predefined termination value is exceeded and the drive axle is stopped.

3. The method of claim 1, wherein the transport unit includes two or more transporters and the method further comprises:
    determining time differences between two markings of each of the at least two transporters;
    comparing the determined time differences to at least one of a corresponding setpoint value and to one another, whereby the setpoint value corresponds to the time difference for error-free functioning of the transport unit, and
    when a deviation between a setpoint value and a determined time difference or a deviation between the time differences is determined to exceed a threshold value, stopping the drive axle.

4. The method of claim 1, wherein the drive axle and the deflection axle are stopped when the deviation is determined to exceed the threshold value.

5. The method of claim 1, wherein the transport unit has at least one transporter guide, wherein the movement of the at least one transporter for the at least one transporter guide is stopped when the deviation is determined to exceed the threshold value.

6. The method of claim 1, wherein the markings of the deflection axle are provided by teeth of a deflection roller.

7. The method of claim 1, wherein the markings of the at least one transporter are provided by teeth on the transporter.

8. The method of claim 1, wherein the markings of the at least one transporter are provided by edges of guide units which are fastened to the at least one transporter.

9. A packaging device for individual pharmaceutical portions, the packaging device comprising:
    a plurality of supply and dispensing units, a control unit, a drive axle, a deflection axle, and a motor coupled to the control unit;
    a transport unit having at least one transporter, the at least one transporter driven by the drive axle coupled to the motor and returned via the deflection axle, wherein at least one of the deflection axle and the at least one transporter has markings;
    a plurality of guide units fastened to the at least one transporter and having a plurality of receiving openings aligned with delivery openings of the plurality of supply and dispensing units when the guide units move;
    a packaging unit supplied with pharmaceutical portions via the guide units; and
    a sensor system coupled to the control unit, the sensor system and control unit configured to determine a travel difference and a time difference between two markings,
    wherein the control unit is configured to compare the determined difference to a setpoint value, wherein the setpoint value corresponds to a determined difference for an error-free transport unit, and wherein the control unit stops the drive axle when a deviation that exceeds a threshold value is determined.

10. The packaging device of claim 9, wherein the determined difference between two markings is a travel difference.

11. The packaging device of claim 9, wherein the determined difference between two markings is a time difference.

12. The packaging device of claim 9, wherein the transport unit has a first sensor system associated with a first transporter and a second sensor system associated with a second transport unit,
    wherein a first difference between two markings of the first transporter and a second difference between two markings of the second transporter are determinable,
    wherein the control unit is configured to compare the first and second determined differences to a setpoint value, and
    wherein the control unit is configured to stop the drive axle when a deviation of one of the first and second determined differences is determined to exceed the threshold value.

13. The packaging device of claim 9, wherein the transport unit has a first sensor system associated with a first transporter and a second sensor system associated with a second transport unit,
    wherein a first difference between two markings of the first transporter and a second difference between two markings of the second transporter are determinable,
    wherein the control unit is configured to compare the first and second determined differences to one another, and wherein the control unit is configured to stop the drive axle when a deviation between the first and second determined differences is determined to exceed the threshold value.

14. The packaging device of claim 9, wherein the transport unit has at least one transporter guide coupled to the control unit, wherein the transporter guide stops the movement of the transporter when the deviation is determined.

15. The packaging device of claim 9, wherein the markings of the deflection axle are provided by teeth of a deflection roller.

16. The packaging device of claim 9, wherein the markings of the transporter are provided by teeth on the transporter.

17. The packaging device of claim 9, wherein the markings of the transporter are provided by edges of guide units fastened to the transporter.

18. A method for operating a packaging device for individual pharmaceutical portions, the method comprising:
 driving a transporter of a transport unit with a drive axle coupled to a motor;
 returning the transporter with a deflection axle;
 moving a plurality of guide units fastened to a transporter of a transport unit along a plurality of supply and dispensing units to align delivery openings of the supply and dispensing units with receiving openings of the guide units;
 determining a difference between two markings of one of the transporter and the deflection axle;
 comparing the determined difference to a corresponding setpoint value, the setpoint value corresponding to a determined difference associated with the transport unit functioning without error; and
 stopping the drive axle when a deviation between the setpoint value and the determined difference exceeds a threshold value.

19. The method of claim 18, wherein the determined difference comprises one of a travel difference and a time difference.

20. The method of claim 18, wherein the markings are provided by at least one of teeth of a deflection roller, teeth on the transporter and edges of the guide units.

* * * * *